SANDERSON & SHATTUCK
Seed Planter.
No. 78,396.  Patented May 26, 1868.
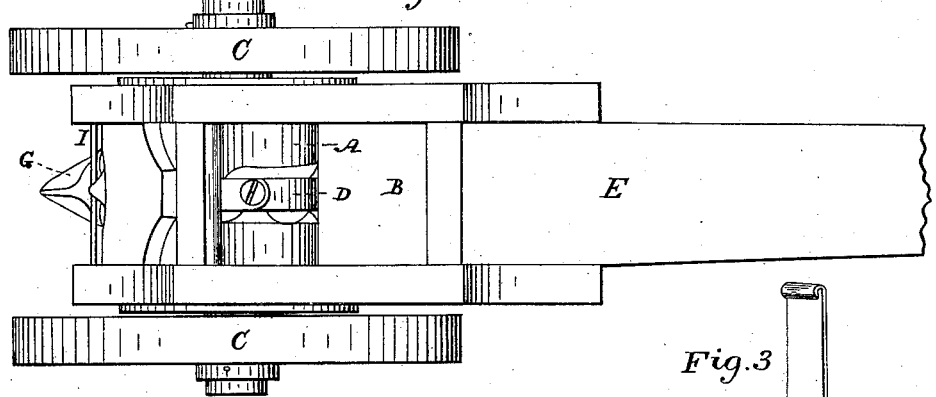
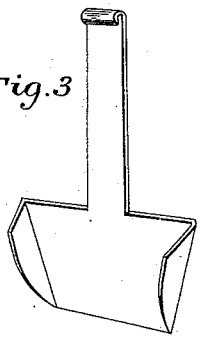
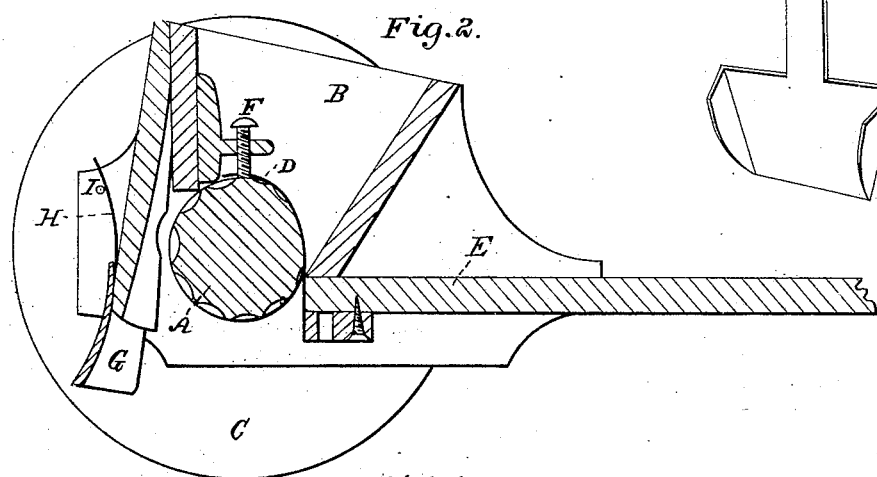
Witnesses:  
Cornelius Cox  
Leopold Such
Inventors:  
E. W. Sanderson  
W. A. Shattuck  
per Alexander Hnorson  
Attys.

United States Patent Office.

E. W. SANDERSON AND W. A. SHATTUCK, OF HILLSBORO COUNTY, NEW HAMPSHIRE, ASSIGNORS TO THEMSELVES, BENJAMIN WHITING, AND H. J. MILLER.

Letters Patent No. 78,396, dated May 26, 1868.

IMPROVEMENT IN HAND SEED-SOWERS.

The Schedule referred to in these Letters Patent and making part of the same.

TO ALL WHOM IT MAY CONCERN:

Be it known that we, E. W. SANDERSON and W. A. SHATTUCK, both of the county of Hillsboro, and in the State of New Hampshire, have invented certain new and useful Improvements in Hand Seed-Sowers; and do hereby declare that the following is a full, clear, and exact description thereof, reference being had to the accompanying drawings, and to the letters of reference marked thereon.

In the annexed drawings, forming part of this specification—

Figure 1 represents a plan view of the machine.

Figure 2, a side sectional view of the same; and

Figure 3 is a view of a substitute for the plough.

Figure 4 is a view of the cylinder with its grooves.

A represents a cylinder or roller inside of the seed-hopper B, and fastened to the axle of the wheels C, so that it revolves at the same time with them.

This cylinder A is grooved, and has a metal strap, D, over it in such a manner that the seed can pass in the grooves and under the strap out, and drop in the ground. The lower end of the strap D is fastened to the tongue E of the machine, and can be raised or lowered on top of the cylinder by means of the screw F, as shown in fig. 2. The plough G, in front of the seed-hopper B, is fastened in such a manner that when the plough should happen to strike any roots or other hard substance it will slightly give by means of the spring H, which rests on a rod, I, in the projecting front part of the hopper.

The advantages of this improvement are that by changing the straps D, having them of different sizes, the machine can be adapted to any kind of seed, the seeds are not broken, and, by using a larger roller or cylinder, any number of grooves can be used.

Having thus fully described our invention, what we claim as new, and desire to secure by Letters Patent, is—

1. The cylinder A, with grooves and straps D, made and arranged and operating with screw F, substantially as and for the purposes set forth.

2. The arrangement of the plough G with spring H, arranged and operating substantially as and for the purposes above set forth.

In testimony that we claim the foregoing, we have hereunto set our hands, this 8th day of April, 1868.

E. W. SANDERSON,
            W. A. SHATTUCK.

Witnesses:
 HIRAM CAMPBELL,
 E. P. EMERSON.